United States Patent
Sobhani Tehrani et al.

(10) Patent No.: US 7,822,697 B2
(45) Date of Patent: Oct. 26, 2010

(54) METHOD AND APPARATUS FOR INFRASTRUCTURE HEALTH MONITORING AND ANALYSIS WHEREIN ANOMALIES ARE DETECTED BY COMPARING MEASURED OUTPUTS TO ESTIMATED/MODELED OUTPUTS BY USING A DELAY

(75) Inventors: Ehsan Sobhani Tehrani, Montreal (CA); Armenih Garabedian, Ville St-Laurent (CA); Khashayar Khorasani, Kirkland (CA); Ashutosh Bagchi, Pierrefonds (CA); Anand Joshi, St. Laurent (CA)

(73) Assignee: Globvision Inc., St-Laurent (CA)

( * ) Notice: Subject to any disclaimer, the term of this patent is extended or adjusted under 35 U.S.C. 154(b) by 651 days.

(21) Appl. No.: 11/882,983

(22) Filed: Aug. 8, 2007

(65) Prior Publication Data

US 2008/0082470 A1 Apr. 3, 2008

Related U.S. Application Data

(60) Provisional application No. 60/847,929, filed on Sep. 29, 2006.

(51) Int. Cl.
*G06E 1/00* (2006.01)
(52) U.S. Cl. ...................................... 706/21
(58) Field of Classification Search ............... 706/21, 706/45, 62, 12, 1, 2, 15; 700/29, 44; 703/21, 703/14, 22
See application file for complete search history.

(56) References Cited

U.S. PATENT DOCUMENTS

| | | | | |
|---|---|---|---|---|
| 5,857,321 A | * | 1/1999 | Rajamani et al. | 60/39.27 |
| 6,181,975 B1 | * | 1/2001 | Gross et al. | 700/29 |
| 6,694,742 B2 | * | 2/2004 | Rajamani et al. | 60/772 |
| 6,804,600 B1 | * | 10/2004 | Uluyol et al. | 701/100 |
| 6,895,286 B2 | * | 5/2005 | Kaji et al. | 700/28 |

OTHER PUBLICATIONS

Eakle et al., Optimizing Combustion to reduce NOx and improve boiler efficiency using constrained empirical optimization based on bayesian models, 1998, ICE-vol. 30-1, pp. 87-92.*

* cited by examiner

*Primary Examiner*—David R Vincent
(74) *Attorney, Agent, or Firm*—Ogilvy Renault LLP

(57) ABSTRACT

There is described herein a method for detecting anomalies in an infrastructure, the method comprising: providing a computationally-intelligent analysis model to model a behaviour of at least one detection instrument in said infrastructure; inputting control instrument data into said analysis model, said control instrument data being provided by control instruments in said infrastructure; outputting an estimated behaviour for said at least one detection instrument from said analysis model; comparing actual data from said at least one detection instrument to said estimated behaviour and generating a set of residuals representing a difference between said actual data and said estimated behaviour; and identifying anomalies when said residuals exceed a predetermined threshold.

23 Claims, 3 Drawing Sheets

METHOD AND APPARATUS FOR INFRASTRUCTURE HEALTH MONITORING AND ANALYSIS WHEREIN ANOMALIES ARE DETECTED BY COMPARING MEASURED OUTPUTS TO ESTIMATED/MODELED OUTPUTS BY USING A DELAY

CROSS REFERENCE TO RELATED APPLICATIONS

This application claims priority of U.S. Provisional Patent Application No. 60/847,929 filed on Sep. 29, 2006.

FIELD OF THE INVENTION

The present invention relates to the field of health monitoring and analysis of infrastructures such as dams, bridges, and buildings, and more specifically, to an integrated software solution for evaluating the health status of an infrastructure based on instrumentation data such as sensors.

BACKGROUND OF THE INVENTION

Dams are among the most important infrastructures in modern as well as developing countries. This importance is credited mainly due to their key roles in hydroelectric power generation and management of water resources for such diverse purposes as irrigation, water purification, and flood prevention. Thus, ensuring dam safety is of particular concern from economical, life-safety, and environmental viewpoints.

The Hydrostatic-Season-Time (HST) model used to model dam behaviour was first proposed in 1958 by "Electricité de France" for modeling pendulum behavior for the purpose of interpreting concrete dam movements. The HST model is the standard conventional method for modeling dam movements and is currently used by many dam owners around the globe. It is a statistical modeling technique based on multi-linear regression analysis using the historical data of the dam. Among various factors that affect dam structure deformation, HST considers the Hydrostatic pressure (H) (due to reservoir elevation), Season (S) and Time (T) as the basic cause or drive inputs while the displacement at a point in the dam measured by pendulums (plumb-lines) is the effect variable.

HST models can be used for validating future data and separate the effects of the above-mentioned inputs on the output variable. However, it has many limitations. For example, instead of considering the temperature variations explicitly, it approximates the actual air temperature variations with the manufactured virtual season (S) variable. Also, it does not incorporate into its inputs the informative data of other control instruments such as concrete temperature that affect the dam displacement. Furthermore, being a static model, HST is unable to capture the dynamics represented by lag times between cause-effect variables.

Therefore, there is a need to provide an improved solution to monitor and analyse dam health that will produce more accurate results.

SUMMARY

In accordance with a first broad aspect of the present invention, there is provided a method for detecting anomalies in an infrastructure, the method comprising: providing a computationally-intelligent analysis model to model a behaviour of at least one detection instrument in the infrastructure; inputting control instrument data into the analysis model, the control instrument data being provided by control instruments in the infrastructure; outputting an estimated behaviour for the at least one detection instrument from the analysis model; comparing actual data from the at least one detection instrument to the estimated behaviour and generating a set of residuals representing a difference between the actual data and the estimated behaviour; and identifying anomalies when the residuals exceed a predetermined threshold.

In accordance with a second broad aspect, there is provided a method for modeling a behaviour of at least one detection instrument in an infrastructure, the method comprising: using a computationally-intelligent analysis model to represent the behaviour of at least one detection instrument; providing a model learning phase using historical data from at least one of detection instruments and control instruments within the infrastructure to teach the analysis model; saving optimized parameters into the analysis model; providing a model execution/testing phase to predict and evaluate the behaviour in real-time as data is input therein; and outputting a predicted value for the at least one detection instrument.

In accordance with a third broad aspect, there is provided a method for determining a lag time between a cause and an effect in an infrastructure, the method comprising: identifying a first variable as the cause and a second variable as the effect; specifying a desired time period; assigning a maximum possible lag time between the cause and effect; calculating a cross-correlation function between the first variable and the second variable over the desired time period; and shifting forward in time the second variable until the maximum lag time is reached while recalculating the cross-correlation function between each shift in time, wherein a total shift needed to reach a maximum absolute cross-correlation corresponds to the lag time.

In accordance with a fourth broad aspect, there is provided a system for detecting anomalies in an infrastructure, the system comprising: an analysis module comprising a computationally-intelligent model of a behaviour of at least one detection instrument in the infrastructure, the model having control instrument data from the infrastructure as inputs and an estimated behaviour for the at least one detection instrument as an output; a comparison module adapted to compare actual data from the at least one detection instrument to the estimated behaviour and generate a set of residuals representing a difference between the actual data and the estimated behaviour; and a detection module adapted to received the residuals and identify an anomaly when a predetermined threshold is exceeded.

In general, information in the sensor data is encoded in the form of parameterized nonlinear models. These nonlinear models range from feed-forward neural network models to an alternative architecture of neural networks. The application of neural networks is used to model the behavior of any detection instruments in infrastructures such as dams, bridges, and buildings in terms of control instruments. Examples of detection instruments are piezometers, plumb-lines (or suspended pendulums), inverted pendulums, weir flow sensors, extensometers, and inclinometers. Examples of control instruments are sensors for water level, pressure, temperature, etc.

The models are used for the purpose of dam health monitoring and anomaly detection through an approach of residual generation. There is also described a data-driven lag time estimation technique, which can not only provide invaluable information to dam engineers but also help them improve the modeling accuracy of the proposed parameterized nonlinear models.

The data-driven parameterized nonlinear model in the form of a neural network, includes fully connected feed-forward neural networks for the purpose of dam behaviour modeling (Coupled Computationally Intelligent Model (CCIM), and an alternative neural network architecture called Decoupled Computationally Intelligent Model (DCIM). The DCIM is not only able to model the behaviour of all the detection instruments based on the data for all the control instruments, but is also capable of providing the separate effect of each control instrument on the detection instrument of interest.

All main detection instruments in infrastructures, such as plumb-lines, inverted pendulums, piezometers, and weir flow sensors, can be modeled. Plumb-lines (as well as inverted pendulums), piezometers, and weir flow sensors are used extensively in dam structures for measuring dam displacement, uplift pressure, and water flow (especially in the form of seepage) variables, respectively.

Unlike the conventional HST approach, which takes into account the reversible temperature effect on dam displacement implicitly and in the form of a season variable (S), an embodiment of the present invention incorporates all the control instruments data explicitly into the model's inputs. Therefore, the control instruments data such as reservoir/air/concrete temperatures need not be approximately encoded into a single season variable and are directly used in the modeling paradigm. The conventional HST approach models the irreversible effects such as aging explicitly through the use of a time variable (T), which could result in imprecise modeling. However, as opposed to HST technique, an embodiment of the present invention learns the irreversible effects from historical data and encodes such effects implicitly into the model.

An embodiment of the present invention generates a set of signals called residuals, which are indicators of the possible presence of anomalies in the dam. The underlying logic behind the use of residuals for dam health assessment is that if the residuals are all close to zero, the dam is operating under healthy condition while the deviation of any of the residuals from zero neighborhoods is an indication of the presence of anomalies either in dam structure or in dam sensors. This technique generates much fewer false alarms.

The lag time between two variables in a dam structure is estimated using corresponding sensor data. Lag time estimation in cause-effect relationships is important for dam analysts and operators. To date, the conventional technique in dam operations for approximating lag times is the hysteresis curve analysis, which only provides a very rough estimate of the lag time or a range of possible lag times. However, in accordance with an embodiment of the present invention, one would be able to calculate a single and highly accurate lag time estimate based on cross-correlation analysis of the historical data for the two variables.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
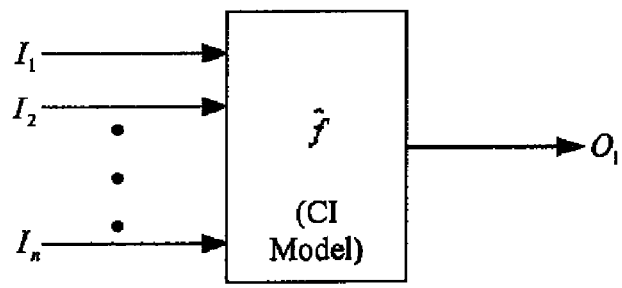
FIG. 1 illustrates the general structure of CCIM.

Many examples will be used herein using darn structures but it should be understood that the present invention may apply to any type of infrastructures such as dams, bridges, and buildings, wherein sensors may be integrated therein and provide control and detection data about the given structure.

As with any other dynamic structure and physical phenomena, it usually takes a while from the time that a change occurs in some variable until the time that such change places its effect on other variables. This is basically called the lag time or time-delay between the two variables that have a dependency. The estimation of such lag times in cause-effect relationships is used by dam analysts and operators. For example, darn engineers figure out how long it takes for the variations in weather conditions (including air temperature, precipitation, etc.) to show their effect on variables such as dam displacement, concrete temperature, uplift pressure, and reservoir elevation. In a dam structure, the value of lag time can spread from a fraction of a minute to hours, days and even a few months depending on the physical location of the two sensors, the speed of the underlying physical process between the two variables, etc.

A data-driven tool for estimating the lag time between two variables in a dam structure using their corresponding sensor data is described herein. First the user has to select the two variables of interest (one considered as the cause/input and the other as the effect/output), specify a desired time period, and assign a reasonable maximum lag time that might exist between the selected variables based on common sense and/or expertise. Then, either the cross-correlation or mutual information index between the two variables is calculated over the specified period. Then, the effect variable would be shifted to the right (or advanced-in-time) one unit at a time until the assigned maximum lag time is reached. After each shift, the correlation function is recalculated. The amount of shift at which the maximum absolute cross-correlation takes place would be considered as the estimate of the lag time while the amount of the maximum cross-correlation itself is a measure of dependency between the two selected variables. Once the user specifies the two variables, the time period, and the maximum feasible lag time, the calculation process of the estimated lag time will be done automatically. In the following we will proceed with the mathematical description of the lag time estimation process.

Consider the example of estimating the lag time between the reservoir elevation (head water level) (H) and uplift pressure (P) measured by piezometers installed on the downstream of the dam, which are considered as cause and effect variables, respectively. Based on the above descriptions we will have the following set of variable definitions:

h: The cause variable of interest (reservoir elevation)
p: The effect variable of interest (uplift pressure)
t: The time variable
T: The desired time period over which the lag time is estimated
$T_s$: The sampling time of the measured or interpolated data
k: An integer index
$C_k$: The series of calculated cross correlations
$C_{max}$: The maximum value of the correlation series
$D_{max}$: The Maximum feasible lag time (delay)
$D_k$: The Series of the calculated lag times $\hat{D}^{h,p}$: The estimated lag time between the two variables of interest h,p Then the cross-correlation function is calculated for all the indices k, each representing an advanced-in-time version of the effect variable p as follows:

$$C_k = \frac{\sum_t (h(t) - E\{h(t)\})(p(t+D_k) - E\{p(t+D_k)\})}{\sqrt{\sum_t (h(t) - E\{h(t)\})^2 \sum_t (p(t+D_k) - E\{p(t+D_k)\})^2}},$$

$$k \in \{0, 1, \ldots, k_{max}\}$$

where, $$D_k = k \cdot T_s; k_{max} = \frac{D_{max}}{T_s}; E\{\cdot\}$$

is the expectation operation that calculates the mean value of a signal.

Then the estimated lag time is defined mathematically as:

$$\hat{D}^{h,p} = \{D_k = k \cdot T_s | C_k = C_{max}\}, k \in \{0, 1, \ldots, k_{max}\}$$

or more compactly, $$\hat{D}^{h,p} = \underset{D_k = kT_s, k \in \{0,1,\ldots,k_{max}\}}{\operatorname{argmax}} C_k$$

Accurate modeling of the cause-effect relationship between a sensor considered as effect variable and one (or a set of) other sensor(s) considered as cause variable(s) is used for health monitoring and anomaly detection. Furthermore, an accurate model will provide the dam specialists and dam safety engineers a much deeper insight into and better understanding of the physical phenomena underlying the dam structures.

The CI models that correspond to an embodiment of the present invention belong to the class of data-driven models. In data-driven models, the unknown and often highly nonlinear functionality or cause-effect relationship between relevant sensors is learned using the accumulated sensory data over a period of time. Data-driven models are used due to the existence of numerous instrumentations/sensors in dam structures and also the insufficiency of basic physical principles/laws in representing the overall dam dynamics in the form of lumped and computationally feasible models.

The CI models including both the CCIM and DCIM models are nonlinear parameterized models with the parameters of the models being adapted by proper optimization techniques using the historical sensor data. The optimization process involved is called the model learning process. After the termination of the model-learning phase, the optimized parameters are saved into the model. Thereafter, the saved model can be used to predict and evaluate the dam behaviour in real-time as the data comes in. This is called the model execution (or testing) phase.

Before getting into more details of the model learning and execution (or testing) processes, which are similar for both the CCIM and the DCIM models, the architecture of these two models will first be described. An Artificial Neural Networks (ANN) is used as nonlinear parameterized models with the parameters (weights) of the ANN as well as its inputs appearing nonlinearly in the equations. However, an alternative is to implement the CI models by using Fuzzy-Neural and Bayesian networks.

Coupled CI model: In this structure, the output of the model is a joint function of all the input variables. More precisely, a single ANN approximates an unknown joint function of the input variables. The general structure of CCIM is depicted in FIG. 1. In mathematical terms, the CI model represents a function $\hat{f}$ shown below that calculates the coupled contribution of all the cause/input variables $I_1, I_2, \ldots, I_n$ to the output variable $O_1$:

$$O_1 = \hat{f}(I_1, I_2, \ldots, I_n)$$

An advantage of the CCIM over the DCIM model is that it can capture the possible nonlinear interactions among the input variables themselves. The detailed architecture of the CCIM as applied to displacement modeling is given in FIG. 2. As can be seen in the figure and was mentioned above, both air and concrete temperatures are incorporated explicitly into the model input. Also, any other available control instrument data can be incorporated into the model architecture as shown in the figure. The dynamic nature of dam displacement behaviour with respect to its drivers is captured and encoded into the model through the use of delay elements in the input layer. The value of delays ($\hat{D}^{h,d}, \hat{D}^{T_A,d}, \hat{D}^{T_C,d}, \hat{D}^{x,d}$) are set equal to the estimated lag time between each input and the dam displacement found by using the aforesaid lag time estimation technique.

Based on the given CCIM architecture, the dam displacement can be written mathematically as:

$$d(t) = W^{out} \cdot F(W^{hid} \cdot I(t))$$

where, $W^{out}$, $W^{hid}$ are the parameters (weights) of the model, $$I(t) = [h(t - \hat{D}^{h,d}) T_A(t - \hat{D}^{T_A,d}) T_C(t - \hat{D}^{T_C,d}) x(t - \hat{D}^{x,d})]^T$$

is the input vector, F(•) is one of the standard activation functions such as the tangent hyperbolic function extensively used in ANN literature.

Figure 3:
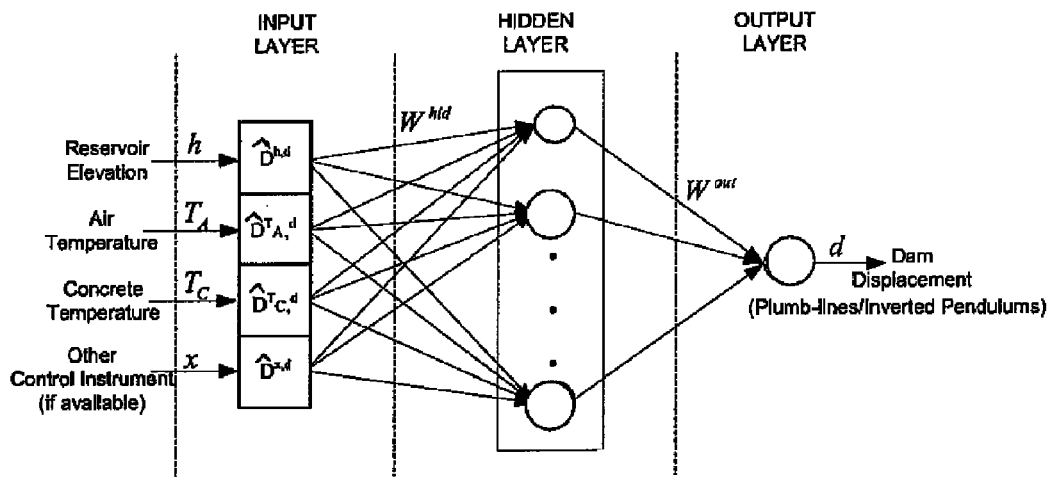
FIG. 3 is a block diagram of an architecture of CCIM as applied to darn uplift pressure modeling.

As was mentioned previously, one of the aspects of this method is the existence of CI models (both CCIM and DCIM) for not only dam displacement modeling but also for all three detection instruments such as piezometers measuring dam uplift pressure and weir flow sensors measuring seepage. The architecture of a CCIM model for modeling the behavior of uplift pressure as a function of reservoir elevation, tail water level, rainfall, and other available control instruments data is given in FIG. 3. Again all the delay values are found using the lag time estimation technique.

Figure 4:
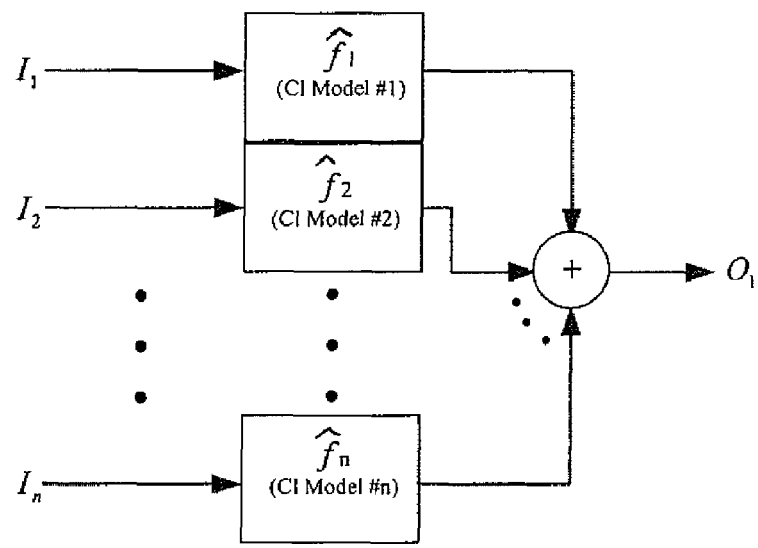
FIG. 4 illustrates the general structure of DCIM.

Decoupled CI model: In this architecture, as opposed to the CCIM, the contribution of each input to the output variable is calculated using a separate CCIM model and then the separate contributions are simply added together. General structure of DCIM is depicted in FIG. 4. Thus, in mathematical notations we will have n CCIM models representing n different functions $\hat{f}_1, \hat{f}_2, \ldots, \hat{f}_n$ of the n different input variables $I_1, I_2, \ldots, I_n$:

$$O_1 = \hat{f}_1(I_1) + \hat{f}_2(I_2) + \ldots + \hat{f}_n(I_n)$$

While DCIM may sacrifice the modeling accuracy due to ignoring the possible interactions among the input variables, an advantage is in providing the separate effect of each input variable on the output of interest. This separation of effects capability is of particular importance in gaining a deeper insight into the physical phenomenon underlying the dam structures such as alkaline reaction in concrete dams and/or other irreversible effects.

Figure 2:
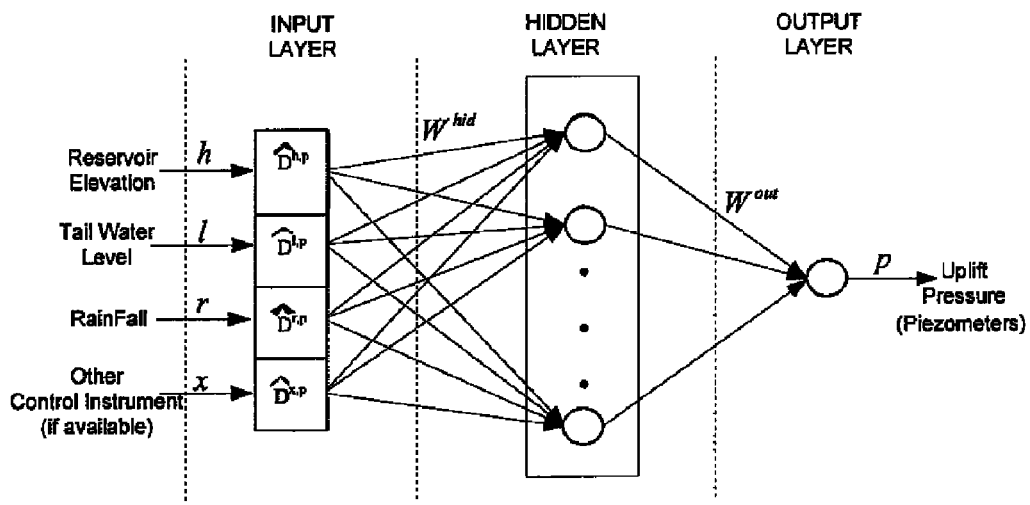
FIG. 2 is a block diagram of an architecture of CCIM as applied to dam displacement modeling.
Figure 5:
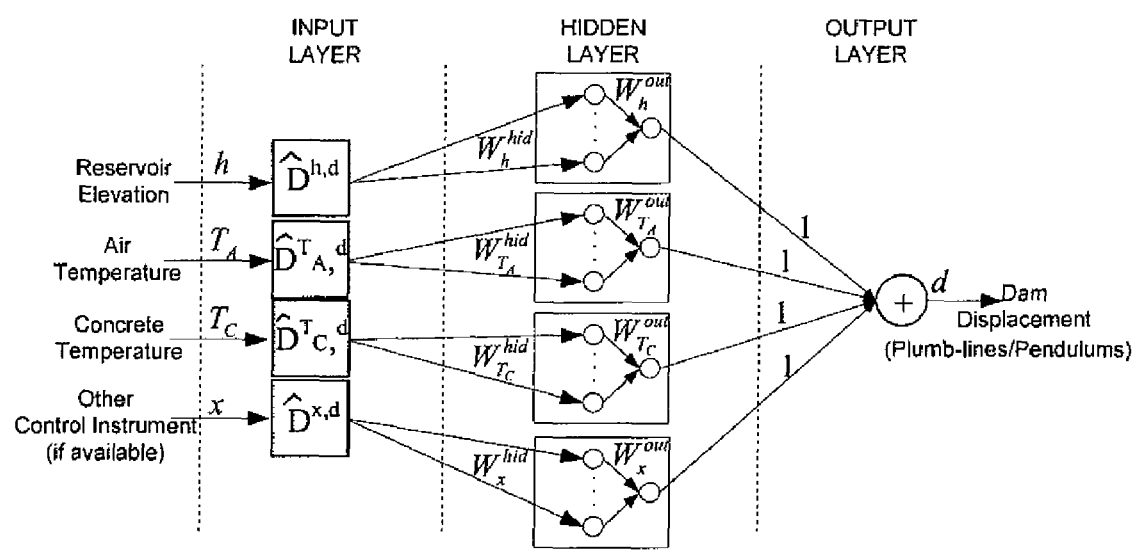
FIG. 5 is a block diagram of an architecture of DCIM as applied to dam displacement modeling.

The detailed architecture of the DCIM as applied to dam displacement modeling is depicted in FIG. 5. The basic differences between this architecture and the one corresponding to CCIM given in FIG. 2 is in the parameters/weights in the output layer in the sense that the output weights in DCIM, as opposed to CCIM, are prefixed to a constant unity value and are not adaptable. Also, in the hidden layer of DCIM we have designed a modular structure of ANNs, which allows us to separate/isolate the effect of each input on the output variable.

Using the given DCIM architecture, dam displacement may mathematically be represented as:

$$d(t) = W_h^{out} \cdot F(W_h^{hid} \cdot h(t - \hat{D}^{h,d})) + W_{T_A}^{out} \cdot F(W_{T_A}^{hid} \cdot T_A(t - \hat{D}^{T_A,d})) + W_{T_C}^{out} \cdot F(W_{T_C}^{hid} \cdot T_C(t - \hat{D}^{T_C,d})) + W_x^{out} \cdot F(W_x^{hid} \cdot x(t - \hat{D}^{x,d}))$$

where, $W_h^{hid}$, $W_h^{out}$, $W_{T_A}^{hid}$, $W_{T_A}^{out}$, $W_{T_C}^{hid}$, $W_{T_C}^{out}$, $W_x^{out}$, $W_x^{out}$ are the parameters of the DCIM model which are adapted during the model learning process. As with the CCIM model, the DCIM model is applicable for modeling the behavior of all control instruments including plumb-lines, inverted pendulums, piezometers, weir flow sensors, and extensometers.

Figure 6:
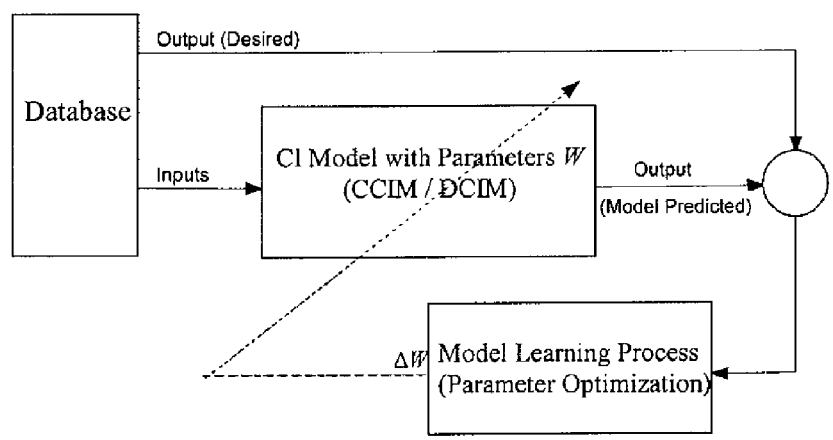
FIG. 6 is a general conceptual representation of the learning process.

Conceptually, the model learning process is the process of adapting the parameters of the CI models (including both CCIM and DCIM) through an optimization process and using input-output historical data. The input-output historical data is the instrumentation/sensor data for different control-detection instruments that are stored in databases. A general representation of the model-learning concept is shown in FIG. 6. As far as the parameter optimization process is concerned, we have employed and coded the nonlinear conjugate gradient algorithm with Fletcher-Reeves formula from optimization literature. The conjugate gradient method is presented here for clarification purposes.

Assume that the parameters of the CI model that we want to adapt are all represented by a generic variable W. Choose the initial values of the parameters W(0). In many cases, a random selection of initial parameters within some reasonable range is sufficient. For W(0), use the well-known back-propagation algorithm to compute the gradient vector g(0). Set the initial direction vector S(0)=r(0)=−g(0). At time step n of the optimization process, use a line search to find η(n) that minimizes $\xi_{av}(\eta)$ sufficiently, representing the optimization cost function $\xi_{av}$, expressed as a function of η for fixed values of W and S. Test to determine if the Euclidean norm of the residual r(n) has fallen below a specified value, that is, a small fraction of the initial value ∥r(0)∥. Update the parameters W(n+1)=W(n)+η(n)S(n). For W(n+1), use back-propagation to compute the updated gradient vector g(n+1). Set r(n+1)=−g(n+1). Use the Fletcher-Reeves formula to calculate β(n+1):

$$\beta(n+1) = \max\left\{\frac{r^T(n)r(n)}{r^T(n-1)r(n-1)}, 0\right\}.$$

Update the direction vector: S(n+1)=r(n+1)+β(n+1)S(n). Set n=n+1, and go back to step 3. Terminate the algorithm when the following condition is satisfied: ∥r(n)∥≦ϵ∥r(0)∥; where ϵ is a prescribed small number.

It should be noted that the average optimization error $\xi_{av}$ is the error between the model predicted output, generated by the CI model, and the desired output, coming from the database, averaged over all the input-output historical data used for learning purposes.

Unlike the model learning process, the model execution (or testing) process is computationally inexpensive. Once the learning process is terminated, the optimized parameter values are getting saved into the model. In the model execution (or testing) process, once the input data comes in, the model equations, that were given previously for both CCIM and DCIM in the case of dam displacement modeling, are calculated in the forward pass to yield the predicted value of the corresponding output variable (i.e., dam displacement). The same mechanism applies for modeling the behaviour of other instrumentations such as uplift pressure, etc.

Dam health monitoring by generating analytical redundancy measures for the three main detection instruments, namely plumb-lines, piezometers, and weir flow sensors are used extensively in dam structures to provide indications of dam deformation/movements, uplift pressure, and water infiltration (or seepage), respectively. The data-driven CI-based models that are described above basically provide the analytical redundancy.

Real-time dam health monitoring and anomaly detection is performed by comparing the actual readings of the sensors of interest against the predictions of the same sensors provided by the corresponding CI models. The difference between the actual sensor values and the predictions, namely the residuals, provide an indication of the possible presence of anomalies in the dam, either being an anomaly in the dam structure or one in the sensor instruments themselves. In other words, as long as the residuals are very close to zero, which necessarily means that the predictions from the CI models follow closely the true measurements, the dam is operating under healthy conditions. On the other hand, deviations of residuals from zero neighbourhoods indicate the presence of anomalies. To be more specific, the actual decision making process involves the comparison of residuals against their associated thresholds in order to claim the presence of faults or anomalies. As soon as the residuals exceed their thresholds, a fault flag is generated. Proper selection of the thresholds has a great impact on the anomaly detection performance. However, the threshold values are set based on the dam safety requirements as well as the accuracy of the predictions for the historical data used during the model-learning process. It is noteworthy to mention that the performance of the anomaly detection is evaluated based on the percentage of missed alarms and false alarms. By missed alarm, we essentially mean missing to announce the presence of an anomaly while it was actually there. Subsequently, false alarm is considered as generation of a fault flag while the dam structure is in the healthy mode of operation.

Furthermore, the proposed solution provides a visual color-coded anomaly detection alarm system. The alarm system contains an array of cells on the computer screen representing all the sensors on a dam site. After the data for all the sensors are validated and checked for the possible existence of faults through either residual evaluation or simple min-max bounds checking, depending on the existence of a CI model for a specific sensor or not, then the health status of the sensors will get updated on the color-coded screen. The health status of the sensors are color-coded in a way that they do not merely indicate the possible presence of a fault but also provide information regarding the severity of the faults as well. The severity of a fault is considered as the amount of deviation of the sensor readings from either the CI model predicted value or the sensor min-max bounds. Also, upon clicking on each cell on the screen, the detailed information for that sensor can be reviewed. Based on the severity of an anomaly, an automatic email or other form of message will be sent to the concerned dam safety engineers for further investigation.

Figure 7:
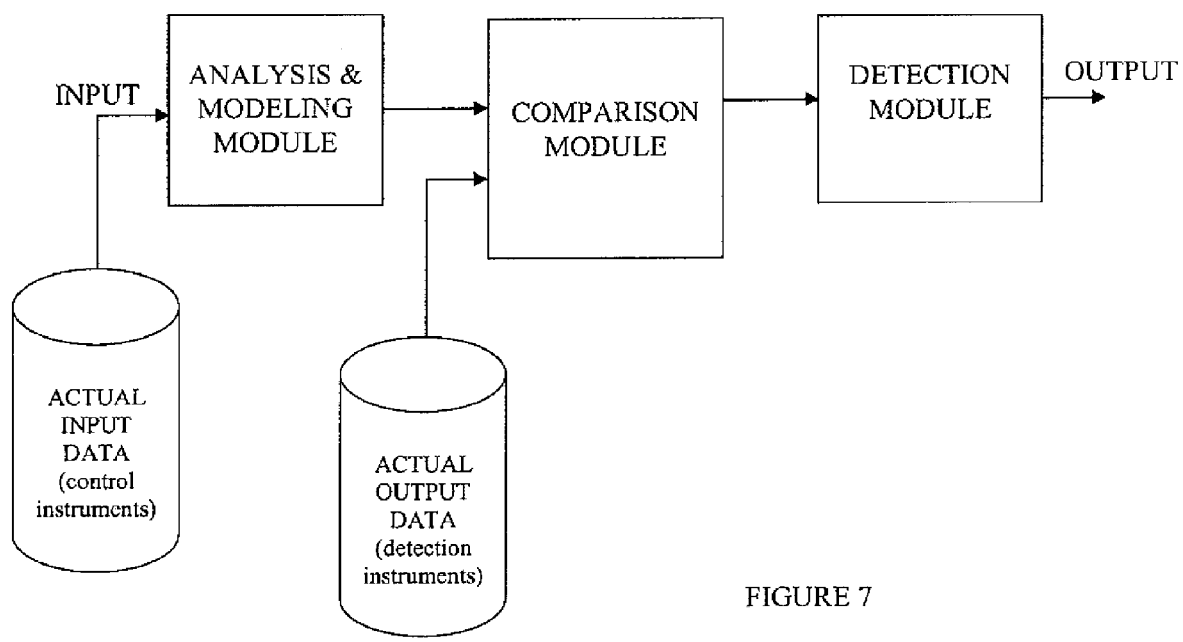
FIG. 7 is a block diagram of a system of an embodiment of the present invention.

FIG. 7 is a block diagram of a system corresponding to an embodiment of the present invention. An analysis module receives control instrument data from infrastructure sensors as input. A mathematical model processes the data and outputs an estimated behaviour for at least one detection instrument. A comparison module receives the estimated behaviour and compares it with actual output data (detection instruments data) stored in a database. A set of residuals corresponding to the difference between the actual data and the estimated behaviour is generated by the comparison module and received by a detection module. The detection module compares the residuals to a predetermined threshold and detects an anomaly when the threshold is exceeded. The anomaly may be in the form of an alarm or a flag, as described below. It should be understood that the mathematical model used to model the behaviour of at least one detection instrument may be a CCIM, DCIM, HST, Fuzzy-neural, Bayesian, or other known models, which are known to a person skilled in the art.

Accessing and visualization of dam instrumentation/sensors data is available for both the past data stored in databases and the data that is measured in real-time as time evolves. The viewing capabilities extend from viewing a single sensor data in the form of a table or a chart to viewing multiple sensor data by simple drag and drop operation. Furthermore, customized layouts of charts and/or tables for a group of sensors of more interest to dam safety operators can be designed and saved into the application so that each time by opening the layout the user would be able to see the data for all those sensors. Thus, the layouts help the dam safety operators to save a lot of time by just one-time loading of the layout of interest without requiring spending so much time to open the sensor data one-by-one.

Data validation and pre-processing/pre-filtering is performed in order to clean up the sensor data from irregularities and spikes as well as missing values. Such irregularities and spikes are quite common due to sensor noise, environmental disturbances, and human operator mistakes or miscalculations. Out of bound values, where the user specifies the upper and lower bounds, are getting detected and replaced by the interpolated values. Similarly, the missing values in the data are replaced by either some fixed value that is specified by the user or by interpolation.

For data analysis and modeling purposes, the data for all sensors should have equal/uniform time-step. However, in almost all existing dam structures there still exist lots of manual measurements, as compared against the measurements that are provided by Automatic Data Acquisition Systems (ADAS). While in all ADAS systems it is fairly simple to adjust or set the reading frequency of the instruments, the manual measurements are characterized with sparse and irregularly time spaced readings. Thus, for successful and meaningful analysis and modeling purposes, we first need to generate time-series with uniform time steps for all the available instrumentation data of interest. The present software solution can generate uniform time series from the raw data with any required time-step such as monthly, daily, hourly, etc., and any desirable type of interpolation techniques including zero-order hold, first-order hold, line interpolation, averaging, sinusoidal interpolation, just to name a few. Also we are able to not only up-sample the raw data using the interpolation techniques some of which are mentioned above, but also the raw data can be down-sampled in cases that the user wants to have a time-series with lower reading frequency than the one of the raw data.

There is provided real-time dam health monitoring by the primitive techniques of bounds checking for both the sensor data and its rate of change. Based on the a priori knowledge on the feasible bounds on a specific sensor and the feasible rate of change of data for that sensor, one can check the raw data against those bounds and evaluate the health status of that specific sensor. As a simple example consider the sensor data for piezometers. Practically, the piezometers data should never show negative values. Thus, whenever a negative value is seen in the data it means that there had been some anomaly such as calibration problem in piezometers.

The embodiments of the invention described above are intended to be exemplary only. The scope of the invention is therefore intended to be limited solely by the scope of the appended claims.

The invention claimed is:

1. A method for detecting anomalies in an infrastructure, the method comprising:
   providing a computationally-intelligent analysis model to model a behavior of at least one detection instrument in said infrastructure;
   inputting control instrument sensor data into said analysis model, said sensor data being provided by sensors in said infrastructure;
   outputting an estimated behavior for said at least one detection instrument from said analysis model;
   comparing measured output data from said at least one detection instrument to said estimated behavior and generating a set of residuals representing a difference between said measured output data and said estimated behavior; and
   identifying anomalies when said residuals exceed a predetermined threshold; and
   wherein said inputting sensor data into said analysis model comprises:
   using lag time information to delay corresponding input data;
   estimating a lag time between a cause and an effect in an infrastructure;
   identifying a first variable as said cause and a second variable as said effect;
   specifying a desired time period over which the lag time is estimated;
   assigning a maximum possible lag time between said cause and effect;
   calculating a cross-correlation function between said first variable and said second variable over said desired time period; and
   shifting forward in time said second variable until said maximum lag time is reached while recalculating said cross-correlation function between each shift in time, wherein a total shift needed to reach a maximum absolute cross-correlation corresponds to said lag time.

2. A method as claimed in claim 1, wherein said infrastructure is a dam.

3. A method as claimed in claim 1, wherein said inputting sensor data comprises inputting one or more temperatures explicitly into the analysis model.

4. A method as claimed in claim 1, wherein said providing a computationally intelligent analysis model comprises providing a neural-network.

5. A method as claimed in claim 4, wherein said providing a neural-network comprises providing a data-driven parameterized nonlinear model.

6. A method as claimed in claim 5, wherein said providing a neural-network comprises providing a coupled computationally intelligent model, an output of said model being a joint function of all input variables.

7. A method as claimed in claim 6, wherein said providing a neural-network comprises providing a decoupled computationally intelligent model, a contribution of each input to an output being calculated separately and added together.

8. A method as claimed in claim 1, wherein said providing a computationally intelligent analysis model comprises providing a fuzzy network.

9. A method as claimed in claim 1, wherein said providing a computationally intelligent analysis model comprises providing a neuro-fuzzy network.

10. A method as claimed in claim 1, wherein said providing a computationally intelligent analysis model comprises providing a Bayesian network.

11. The method as claimed in claim 1, wherein said providing said computationally-intelligent analysis model comprises:
   providing a model learning phase using historical data from at least one of said at least one detection instruments and said sensors within said infrastructure to teach the analysis model;
   saving optimized parameters into said analysis model; and
   providing a model execution/testing phase to predict and evaluate said behavior in real-time as sensor data is input therein; and
   wherein said outputting said estimated behavior comprises outputting a predicted value for said at least one detection instrument.

12. A method as claimed in claim 1, wherein said cause and said effect correspond to said sensors in said infrastructure.

13. A method as claimed in claim 1, wherein said maximum absolute cross-correlation corresponds to a measure of dependency between said cause and said effect.

14. A system for detecting anomalies in an infrastructure, the system comprising:
   an analysis module comprising a computationally-intelligent model of a behavior of at least one detection instrument in said infrastructure, said model having sensor data sensors sensing said infrastructure as inputs and an estimated behavior for said at least one detection instrument as an output;
   a comparison module that compares measured output data from said at least one detection instrument to said estimated behavior and generate a set of residuals representing a difference between said measured output data and said estimated behavior; and
   a detection module that receives said residuals and identifies an anomaly when a predetermined threshold is exceeded; and
   wherein said inputting sensor data into said analysis model comprises:
   using lag-time information to delay corresponding input data;
   estimating a lag time between a cause and an effect in an infrastructure;
   identifying a first variable as said cause and a second variable as said effect;
   specifying a desired time period over which the lag time is estimated;
   assigning a maximum possible lag time between said cause and effect;
   calculating a cross-correlation function between said first variable and said second variable over said desired time period; and
   shifting forward in time said second variable until said maximum lag time is reached while recalculating said cross-correlation function between each shift in time, wherein a total shift needed to reach a maximum absolute cross-correlation corresponds to said lag time.

15. A system as claimed in claim 14, wherein said infrastructure is a dam.

16. A system as claimed in claim 14, wherein said model also uses temperature as input.

17. A system as claimed in claim 14, wherein said model is a neural-network.

18. A system as claimed in claim 17, wherein said neural-network is a data-driven parameterized nonlinear model.

19. A system as claimed in claim 18, wherein said neural-network is a coupled computationally intelligent model, an output of said model being a joint function of all input variables.

20. A system as claimed in claim 18, wherein said neural-network is a decoupled computationally intelligent model, a contribution of each input to an output being calculated separately and added together.

21. A system as claimed in claim 14, wherein said computationally intelligent model is a fuzzy network.

22. A system as claimed in claim 14, wherein said computationally intelligent model is a neuro-fuzzy network.

23. A system as claimed in claim 14, wherein said computationally intelligent model is a Bayesian network.

* * * * *